June 12, 1923. Re. 15,623

R. E. HELLMUND

EXCITING SYSTEM FOR PHASE CONVERTERS

Original Filed Aug. 7, 1916

WITNESSES:
H. T. Shelhamer
A. A. Brand

INVENTOR
Rudolf E. Hellmund
BY
Wesley G. Carr
ATTORNEY

Reissued June 12, 1923.

Re. 15,623

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

EXCITING SYSTEM FOR PHASE CONVERTERS.

Original No. 1,281,955, dated October 15, 1918, Serial No. 113,457, filed August 7, 1916. Application for reissue filed December 29, 1919. Serial No. 348,185.

*To all whom it may concern:*

Be it known that I, RUDOLF E. HELLMUND, a citizen of Germany, and a resident of Swissvale, in the county of Allegheny and State of Pennsylvania, have invented a new and useful Improvement in Exciting Systems for Phase Converters, of which the following is a specification.

My invention relates to exciting systems for phase-converters, particularly of the T-connected, rotary type, and it has for its object to provide systems of the character designated wherein double-frequency electromotive forces for urging the working current through the rotor circuits of said phase-converter may be produced in a simple and effective manner.

Another object of my invention is to provide means, in a system of the character designated, whereby a unidirectional electromotive force may also be produced for supplying direct exciting current to the rotor windings of said phase converter for synchronous operation and phase compensation or balancing therein.

Figure 1:
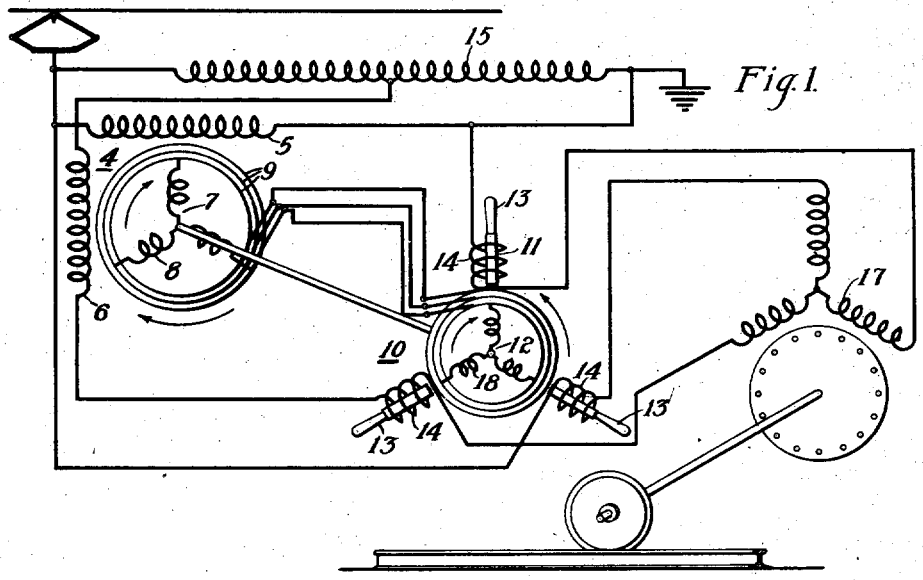
Figure 2:
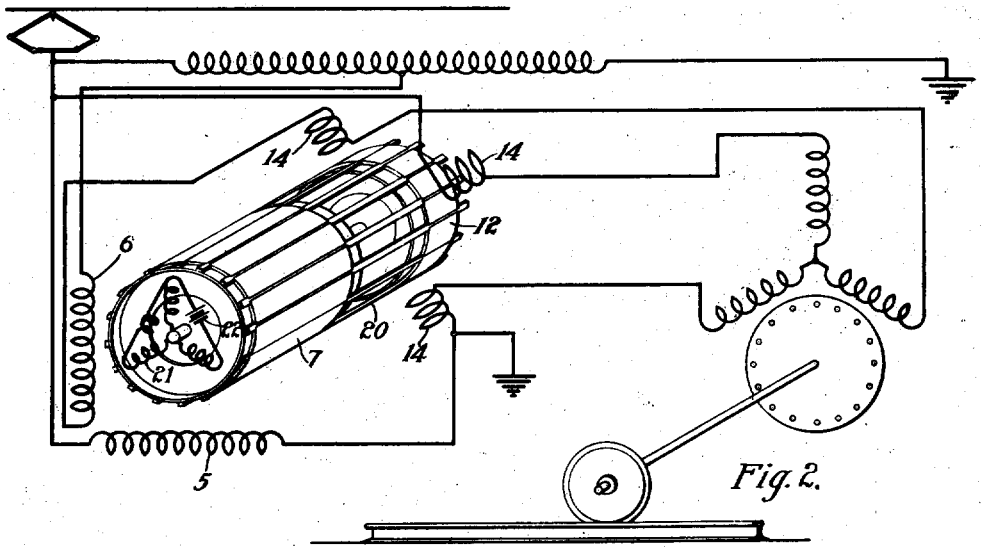
Figure 3:
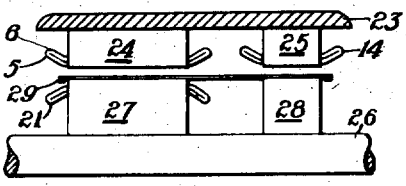

In the accompanying drawing, Fig. 1 is a diagrammatic view of a phase-converter provided with certain coordinating elements, together constituting a system embodying my invention; Fig. 2 is a diagrammatic view of a modification of the system shown in Fig. 1, and Fig. 3 is a fragmentary view, partially in section and partially in elevation, of a composite dynamo-electric machine employed in the system of Fig. 2.

In my copending application, Serial No. 108,567, filed July 11, 1916, I have disclosed and claimed means whereby double-frequency exciting currents may be supplied to the rotor winding of a phase-converter for urging the working currents therethrough, the particular exciting machines employed being of the commutator type. By supplying exciting currents of the character designated, the drops in the various portions of the phase-converter may be compensated for and the phase-converter may be given compounding characteristics of any desired form.

In my copending application, Serial No. 113,454, filed August 7, 1916, I have disclosed and claimed systems similar to those just mentioned but, in addition, means are provided for supplying unidirectional exciting current to the rotor winding of the phase-converter in order to cause the same to operate in synchronism so that phase compensation or balancing may be effected.

By the present invention, I provide systems of the general character above described but the auxiliary exciting machine employed is of the induction type, thus doing away with commutation difficulties. By causing the rotor of the exciter machine to rotate in the same direction and at the same speed as the rotor of the phase converter and by supplying the stator winding of the auxiliary exciter with alternating current from the terminals of the phase-converter, the connections being such that the resultant rotating field in the stator of said auxiliary exciter rotates in the opposite direction from the rotor thereof, there are produced in the rotor winding of the exciter machine double-frequency currents suitable for the compounding of the main phase-converter.

Other details of my invention will hereinafter more fully appear.

Referring to Fig. 1 for a more detailed understanding of my invention, I show a phase-converter of the T-connected rotary type at 4, said phase-converter having a primary stator winding 5, a secondary stator winding 6 and a rotor 7 provided with a star-connected rotor winding 8. The outer terminals of the rotor 8 are connected, respectively, to suitable slip rings 9 for connection to external circuits.

An auxiliary machine 10, of the induction type, is provided for exciting purposes and comprises a stator member 11 and a rotor member 12. The stator winding 11 is phase wound and the magnetic axes of the various poles 14—14 thereof may be adjusted circumferentially by any suitable means as, for example, by mechanical movement thereof through suitable handles 13 or by forming a distributed winding on the stator member and adjusting the points of connection thereof, as shown in Patent No. 1,186,818, issued to the Westinghouse Electric & Manufacturing Company on June 13, 1916, on an application filed by F. W. Meyer.

The rotor member of the auxiliary exciter machine is mounted on the shaft of the phase-converter and turns therewith.

Energy for the operation of the phase-converter is supplied from any suitable source 15, such, for example, as a transformer winding, and energy derived from the secondary winding 6 is combined with energy derived directly from the supply winding for the energization of a polyphase load circuit, such, for example, as a propulsion motor of the polyphase induction type shown at 17. The various divisions 14—14 of the stator winding of the auxiliary exciter machine are inserted, respectively, in the leads between the phase-converter 4 and the load 17, the relative connections being such that the rotating field established in the stator member of the exciter machine rotates in the opposite direction from the rotor thereof. A double-frequency electromotive force is accordingly generated in the rotor phase winding 18 of the exciter machine which is supplied to the rotor winding of the machine 4 through the usual slip rings and brushes.

It is frequently desirable to eliminate even slip rings, as their use necessitates frequent supervision for brush adjustment and lubrication. This result may be attained by forming the rotor members of the phase-converter and of the exciter machine into an integral structure, as indicated at 20 in Fig. 2. The left-hand or major portion of the composite structure 20, corresponding to the rotor member 7 of the phase-converter 4 in Fig. 1, is subject to the influence of the stator primary and secondary windings 5 and 6, whereas the right-hand or minor portion 12 of the composite structure 20 is subject to the influence of the phase windings 14—14. The winding of the composite structure may now take the form of a squirrel-cage, as indicated in my copending application, Serial No. 113,456, filed August 7, 1916, and under these conditions, if the direction of rotation of the rotating field of the windings 14—14 is as previously described, suitable double-frequency currents are generated in the minor portion 12 of the composite structure 20 and are caused to circulate through the major portion 7 thereof to produce the desired compounding.

The major portion 7 of the composite structure 20 may be provided, in addition, with a phase winding 21 and direct-current excitation may be supplied thereto from any suitable source, as indicated at 22, for synchronous operation and for power-factor compensation, as described in detail in my application, Serial No. 113,454, filed August 7, 1916.

The manner in which the various windings of the composite machine of Fig. 2 are mounted and disposed is indicated in Fig. 3 wherein the field frame is shown at 23 as supporting inwardly-projecting field-core members 24 and 25. The member 24 carries the stator windings 5 and 6 and, in like manner, the field member 25 carries the winding 14—14. The shaft of the machine is indicated at 26 and carries rotor core members 27 and 28 in alinement, respectively, with the field members 24 and 25. The squirrel-cage winding is shown at 29 and extends across the face of both rotor core members. The rotor core member 27 is provided, in addition, with the winding 21, as indicated in Fig. 2.

While I have shown my invention in a plurality of forms it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination including a polyphase system having balanced conditions, a dissimilar alternating-current system, an induction machine aggregate, comprising main and auxiliary polyphase primary windings and secondary windings, said secondary windings including a plurality of circuits each of which is subjected to the influence of the flux produced by both said main and auxiliary primary windings, means for connecting said balanced polyphase system in forward phase sequence to said main primary windings, means for connecting said dissimilar system to said main primary windings for interchange of power with said balanced polyphase system, and means for energizing said auxiliary primary windings in reverse phase sequence whereby substantially balanced conditions may be maintained in said balanced polyphase system.

2. In the combination including a polyphase system having balanced conditions, a dissimilar alternating-current system, an induction machine aggregate, comprising main and auxiliary polyphase primary windings and secondary windings, said secondary windings including a plurality of circuits, each of which is subjected to the influence of the flux produced by both said main and auxiliary primary windings, means for connecting said balanced polyphase system in forward phase sequence to said main primary windings, means for connecting said dissimilar system to said main primary windings for interchange of power with said balanced polyphase system, and means for energizing said auxiliary primary windings in reverse phase sequence, the step in the method of maintaining substantially balanced conditions in said balanced polyphase system, which consists in varying the energization of said auxiliary primary windings in accordance with the power interchanged.

3. The combination including a polyphase system having balanced conditions, a dissimilar alternating-current system, an induction machine aggregate, comprising main and auxiliary polyphase primary windings and secondary windings, said secondary windings including a plurality of circuits each of which is subjected to the influence of the flux produced by both said main and auxiliary primary windings, means for connecting said balanced polyphase system in forward phase sequence to said main primary windings, means for connecting said dissimilar system to said main primary windings for interchange of power with said balanced polyphase system, means for energizing said auxiliary primary windings in reverse phase sequence, and means for varying the relative angular position of said reverse-phase-sequence excitation, whereby substantially balanced conditions may be maintained in said balanced polyphase system.

4. An induction machine aggregate, comprising main and auxiliary polyphase primary windings, means for energizing said primary windings respectively in forward and backward phase rotation, means for adjusting the relative angular positions of the useful fluxes produced by said primary windings and secondary windings including a plurality of circuits each of which is subjected to the influence of the flux produced by both said main and auxiliary primary windings, said energizing means being operable to maintain predetermined voltage conditions in said main primary windings.

5. A phase balancer comprising a synchronous dynamo-electric machine having one of its polyphase windings adapted for connection to a polyphase distributing system, a second polyphase winding in inductive relation thereto, and means for introducing polyphase currents into said secondary winding for the purpose of maintaining balanced polyphase conditions in said first winding.

6. A phase balancer comprising a polyphase dynamo-electric machine having a pair of relatively rotatable magnetic members, a main polyphase winding on one of said members adapted for connection to a polyphase distributing system, a polyphase exciting winding on the other of said members, and means for superposing upon the normal excitation of said exciting winding substantially double-synchronous frequency magneto-motive forces for the purpose of maintaining balanced polyphase conditions in said main winding.

7. The combination including main and auxiliary induction machines having their secondaries rotating respectively in forward and backward directions and at corresponding speeds with respect to their respective primaries, and connections between the secondary windings of the two machines.

8. The combination with a polyphase system subject to unbalancing conditions, of a phase-balancer of the rotary type connected thereto, an auxiliary dynamo-electric machine having polyphase purimary windings and relatively rotating secondary windings, means whereby said primary windings are connected to said system so as to produce a field rotating backwardly with respect to its secondary windings, and connections between the secondary windings of the two machines.

9. The combination with a polyphase system subject to unbalancing conditions, of a phase-balancer of the rotary type connected thereto, an auxiliary dynamo-electric machine having polyphase primary windings and relatively rotating secondary windings, means whereby said primary windings are connected to said system so as to produce a field rotating backwardly with respect to its secondary windings, and connections between the secondary windings of the two machines, the secondary windings of the two machines rotating at corresponding speeds with respect to their primary windings.

10. The combination with a main induction machine, of an auxiliary induction machine mechanically associated therewith, means for energizing the primary windings of said main and auxiliary machines respectively in forward and backward phase rotation, and connections between the secondary windings of the two machines.

11. The combination with an alternating-current system, of a phase-converter of the rotary type having its primary winding connected thereto, a substantially two-to-one frequency converter, and connections for inserting said frequency converter between said system and the secondary winding of said phase-converter, whereby said secondary winding is supplied with exciting current of substantially twice the frequency of said system.

12. The combination with a source of alternating current, of a phase-converter of the rotary type connected thereto, an auxiliary dynamo-electric machine provided with a phase-wound primary and having its rotor mechanically coupled to the rotor of said phase-converter, connections whereby the rotating primary field of said auxiliary machine rotates in the opposite direction, with respect to the direction of rotation of the rotor, from the rotating primary field of said phase-converter, and connections between the secondary windings of the two machines.

13. The combination with a source of alternating current, of a phase-converter of the rotary type having its primary winding connected thereto, an auxiliary dynamo-electric machine of the induction type, mechanical coupling means between the rotors of the two machines, electrical connections between the secondary windings of the two machines, and such connections from the output terminals of the phase-converter through the primary winding of said auxiliary machine that the rotating field thereof rotates in the opposite direction from that in which the rotor of said auxiliary machine is driven.

14. The combination with a source of alternating current, of a phase-converter of the rotary type having its primary winding connected thereto, an auxiliary dynamo-electric machine of the induction type, mechanical coupling means between the rotors of the two machines, electrical connections between the secondary windings of the two machines, such connections from the output terminals of the phase-converter through the primary winding of said auxiliary machine that the rotating field thereof rotates in the opposite direction from that in which the rotor of said auxiliary machine is driven, and means for adjusting the phase of the exciting currents supplied by said auxiliary machine to said phase-converter.

15. The combination with a source of alternating current, of a phase-converter of the rotary type having its primary winding connected thereto, an auxiliary dynamo-electric machine of the induction type, mechanical coupling means between the rotors of the two machines, electrical connections between the secondaries of the two machines, such connections from the output terminals of the phase-converter through the primary winding of said auxiliary machine that the rotating field thereof rotates in the opposite direction from that in which the rotor of said auxiliary machine is driven and means for moving the location of the magnetic axes of the poles of the primary of said auxiliary machine circumferentially relatively to the secondary winding, whereby the phase of the exciting currents furnished thereby to said phase-converter may be adjusted.

16. The combination with a source of alternating current, of a phase-converter of the rotary type having its primary winding connected thereto, an auxiliary dynamo-electric machine of the induction type, mechanical coupling means between the rotors of the two machines, electrical connections between the secondary windings of the two machines, such connections from the output terminals of the phase-converter through the primary winding of said auxiliary machine that the rotating field thereof rotates in the opposite direction from that in which the rotor of said auxiliary machine is driven, and additional means for supplying unidirectional current to the secondary of said phase-converter.

In testimony whereof, I have hereunto subscribed my name this 23rd day of December, 1919.

RUDOLF E. HELLMUND.